May 21, 1935.  E. G. GUNN  2,001,958
BRAKE
Filed June 14, 1929    3 Sheets-Sheet 2

Inventor
Earl G. Gunn,
By
Offield Mehlhope Peatt + Poole
Atty's.

Witness:
Chas. R. Koursh.

May 21, 1935. E. G. GUNN 2,001,958
BRAKE
Filed June 14, 1929 3 Sheets-Sheet 3

Patented May 21, 1935

2,001,958

UNITED STATES PATENT OFFICE 2,001,958

BRAKE

Earl G. Gunn, Racine, Wis., assignor, by mesne assignments, to Bendix Products Corporation, South Bend, Ind., a corporation of Indiana Application June 14, 1929, Serial No. 370,802

14 Claims. (Cl. 188—78)

This invention relates to improvements in brakes, particularly designed for automotive vehicles, and more especially to internal band brakes, and has for its principal object to provide an improved and simplified construction for brakes of the character described, wherein the cumulative effect of braking torque at the anchored end of the brake band is controlled so as to eliminate excessive unit pressures on certain areas of the brake band, as is usually present with ordinary internal band brake constructions heretofore employed.

Many internal band brake structures have heretofore been proposed for use in connection with automotive vehicles, but they have been generally unsatisfactory, due largely to the difficulty in limiting and controlling the wrapping-in action of such brakes when they are applied, which tends to cause grabbing or locking of the brake band, which tendency, of course, is especially hazardous in automotive vehicles. I have found, however, that most of the difficulties with brakes of this character are due to the cumulative effect of braking torque at the anchored end of the brake band, which tends to cause excessive pressures per unit area of the brake band adjacent the anchor point.

In carrying out my invention I provide means for eliminating the difficulties above referred to by introducing a pivoted link connection between the anchor pin and the anchored end of the band, this link being arranged in such a position as to be placed under tension when the brake is applied, and with the braking torque acting in such direction as to stabilize and control the forces which otherwise would tend to wedge the shoe toward the drum at the point of anchorage. The angle of the tension link is such as to distribute the pressures over a relatively wide area of the brake band, and thus eliminate the main difficulty in operation of such brakes, as hereinabove outlined.

The invention may best be understood by reference to the accompanying drawings, in which Figure 1 is a front view of a brake constructed in accordance with my invention, with the brake drum shown in section.

Figure 1:
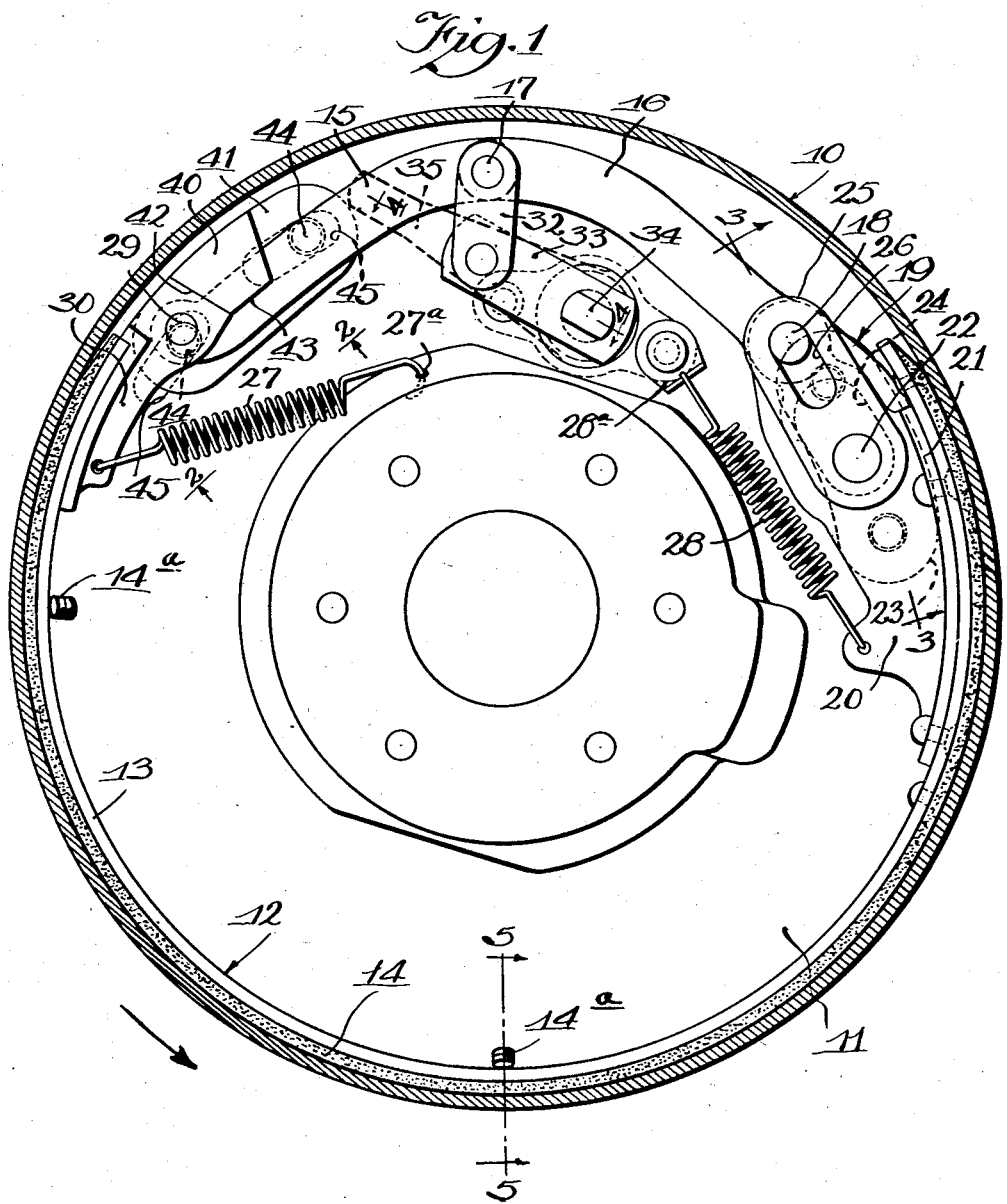

Referring now more particularly to details shown in the drawings, the brake illustrated in Figures 1 to 5 comprises a brake drum 10 which is mounted on the wheel (not shown) in the usual manner, and with a backing plate 11 in non-rotative relation to the axle and upon which is mounted the brake band 12 and its operating mechanism.

The brake band comprises a metallic band member 13 which herein extends through an arc of substantially more than 180°, and is provided with a suitable friction surface 14 which preferably is of a composition having a relatively low coefficient of friction, such as is commonly used in brake structures having a servo action.

Suitable expansion and contraction means are provided for the opposite ends of the brake band, in the form shown this means comprising two links 15 and 16 pivotally connected at their adjacent ends on pin 17 to form a toggle arrangement. The link 16 is pivotally connected by pin 18 to an end piece 19, which in the form shown in Figure 1 consists of an upstanding web member 20 having base flanges 21—21 riveted to the inner face of the band 13 adjacent one end thereof.

The end piece 19 forms the anchored end of the brake band when the vehicle is moving forwardly, with the wheel and drum rotating in a counter-clockwise direction, as indicated by the arrow. The brake anchor comprises a pin 22 suitably secured to the backing plate, as for instance, by means of an integral bracket 23, and extending through an elongated slot 24 formed in the web 20 of the end piece 19. A pair of links 25—25 are pivotally mounted on the anchor pin 22 at opposite sides of the web 20 and extend toward the extreme end of said end piece, where they are pivotally connected on pin 18, which, in the form shown, also forms the pivotal connection between the toggle link 16 and the end piece 19, as previously described. The pivot pin 18 works in elongated slots 26, 26 formed in links 25, 25, as shown.

Figure 4:
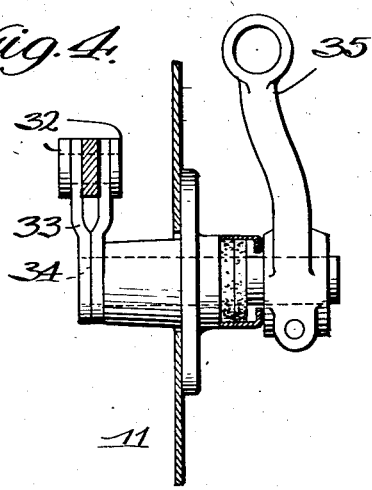
Figure 4 is a detail section taken on line 4—4 of Figure 1.

The toggle link 15 is connected to the opposite end of the brake band by a pivot pin 29 carried by end piece 30. The toggle mechanism is suitably actuated for spreading the adjacent ends of the brake band apart to apply the brake, as for instance, by means of a link 32 pivotally connected to lever 33 on shaft 34, which shaft extends through and has bearing in the backing plate 11, as shown in Figure 4, and is rotated by suitable means, including an operating lever 35 on the outside of the backing plate.

Figure 5:
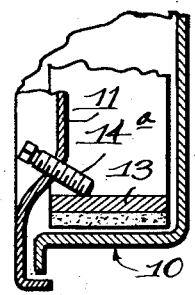
Figure 5 is a detail section taken on line 5—5 of Figure 1.

Tension devices are also provided in the usual manner for normally holding the brake band in contracted position. In the form shown, a pair of springs 27 and 28 are provided for this purpose, the spring 27 being connected between the end piece 30 and an aperture 27a formed in the backing plate 11, and the spring 28 being connected between the web 20 of end piece 19 and a bracket 28a also suitably connected to the backing plate 11, as shown. Any suitable means may be provided for limiting the radial movement of the brake band in its contracted position, in the form shown a plurality of set screws 14a—14a extend at an angle through the backing plate 11 in position to engage the inner face of said brake band, as shown in Figure 5.

The arrangement above described is such that when the wheel and brake drum are rotated in counter-clockwise direction, the brake is applied through the toggle mechanism just described, so as to spread the opposite ends of the brake band and move them into engagement with the drum. As soon as the brake band becomes frictionally engaged with the drum, the rotation of the drum tends to carry the brake band bodily in a counter-clockwise direction therewith. The cumulative effect of the braking action is transferred to the anchored point of the brake band, which in the present case comprises the pin 18, to which the extreme end of the links 25, 25 is connected. This places said links under tension between the pin 18 and the anchor 22, so that the entire reaction is taken by the links 25.

It will be observed that the links 25, 25 are preferably mounted with their longitudinal axes in a plane which is substantially parallel with a tangent drawn through the face of the friction band at its extreme point of engagement with the drum. In other words, a line passing through the two axial points of the links 25 is substantially at right angles to a radial line including the axis of pivot pin 18. This arrangement tends to stabilize the position of the end piece 19 at the pivot pin 18, relative to the drum, so that the accumulated pressure does not have the usual effect tending to wedge the portion of brake band immediately adjacent its anchor against the drum, but the pressure is distributed over a much wider arc of the brake band, including the friction surface connected with or immediately adjacent the relatively rigid end piece 19. By distributing the braking pressure as aforesaid, the wrapping-in action of the brake is effectively limited to such a degree as to render the operation of this type of brake entirely safe, smooth, and efficient.

It will be observed further that the angle of the tension link 25 (the two links being considered as a unit) relative to the periphery of the brake band may be varied within reasonable limits from that shown and described herein, it being noted that when the free end of the link is inclined more toward the axis of the wheel, the effect when braking pressures are applied is to tend to resist the movement of the anchored end of the brake band toward the drum, while an inclination of said link toward the drum increases the tendency to move said anchored end toward the drum. Accordingly, it will be understood that the amount of effective pressure adjacent the anchored end of the brake band may be effectively varied and controlled as desired.

For simplicity the tension link anchor connection for the brake band, as above described, is shown herein as applied to but one end of said band so as to be effective when the vehicle is moving forwardly with the wheel and drum rotating in a counter-clockwise direction.

Accordingly, I have illustrated herein a simplified form of brake anchor for the end piece 30 which comprises an anchor block 40 carried on a bracket 41 fixed to the backing plate 11, as shown. The anchor block 40 is provided with an inclined engaging face 42 against which the end piece 30 is brought into contact when the brakes are applied, with the wheel and drum rotating in a clockwise direction. This engaging face 42 is preferably arranged substantially at right angles to a line drawn at a tangent to the adjacent end of the friction surface of the brake band, as shown, this arrangement being preferable in order to take the thrust of the brake band in the proper tangential direction.

Figure 2:
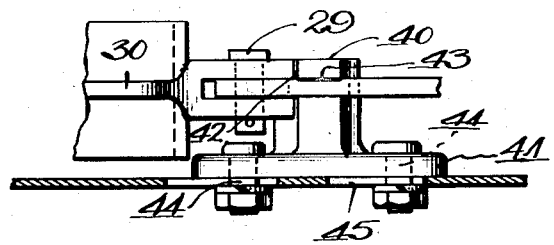
Figure 2 is a detail section taken on line 2—2 of Figure 1.
Figure 3:
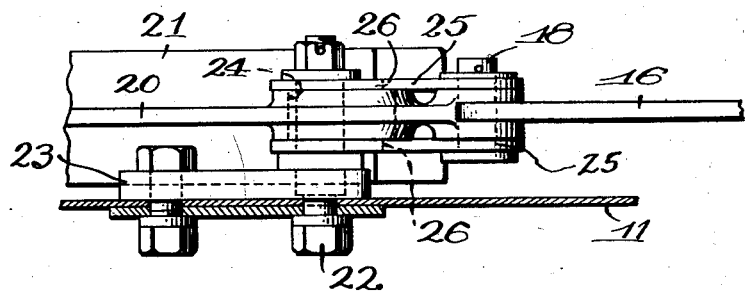
Figure 3 is a detail section taken on line 3—3 of Figure 1.

In the preferred form shown, the anchor block 40 is provided with an open slot 43 on its inner face within which the toggle link 15 is guided, as shown in Figure 2. This arrangement affords means for positioning the brake band axially of the drum as well as providing a guide to maintain the movement of the toggle link 15 in its proper path.

When the brake is applied in the reverse or clockwise direction, the brake band 13 is bodily moved in the same direction so that the braking reaction is taken by anchor pin 40. The elongated slots 26, 26 of links 25 allow for movement of pin 18 at the opposite or unanchored end of the shoe.

Adjustment of the brake, both for initially setting and to compensate for wear, is provided by means of the anchor block 40 and its base 41, which is adjustable circumferentially of the backing plate by means of securing bolts 44—44, which may be adjusted in various positions along circumferentially arranged slots 45—45 in said backing plate.

In the modified form shown in Figure 6, similar operating parts of the brake bear reference numerals similar to those described in connection with the foregoing figures, excepting that the brake band 13a is formed with an integral web 13b which is substantially uniform in height excepting adjacent the anchored end thereof where said web is increased in height as indicated at 20b so as to afford the desired relative rigidity of the brake band adjacent its anchored end. This construction is particularly preferable when it is desired to form the brake band by casting the same, as for instance by the process of die casting.

Figure 6:
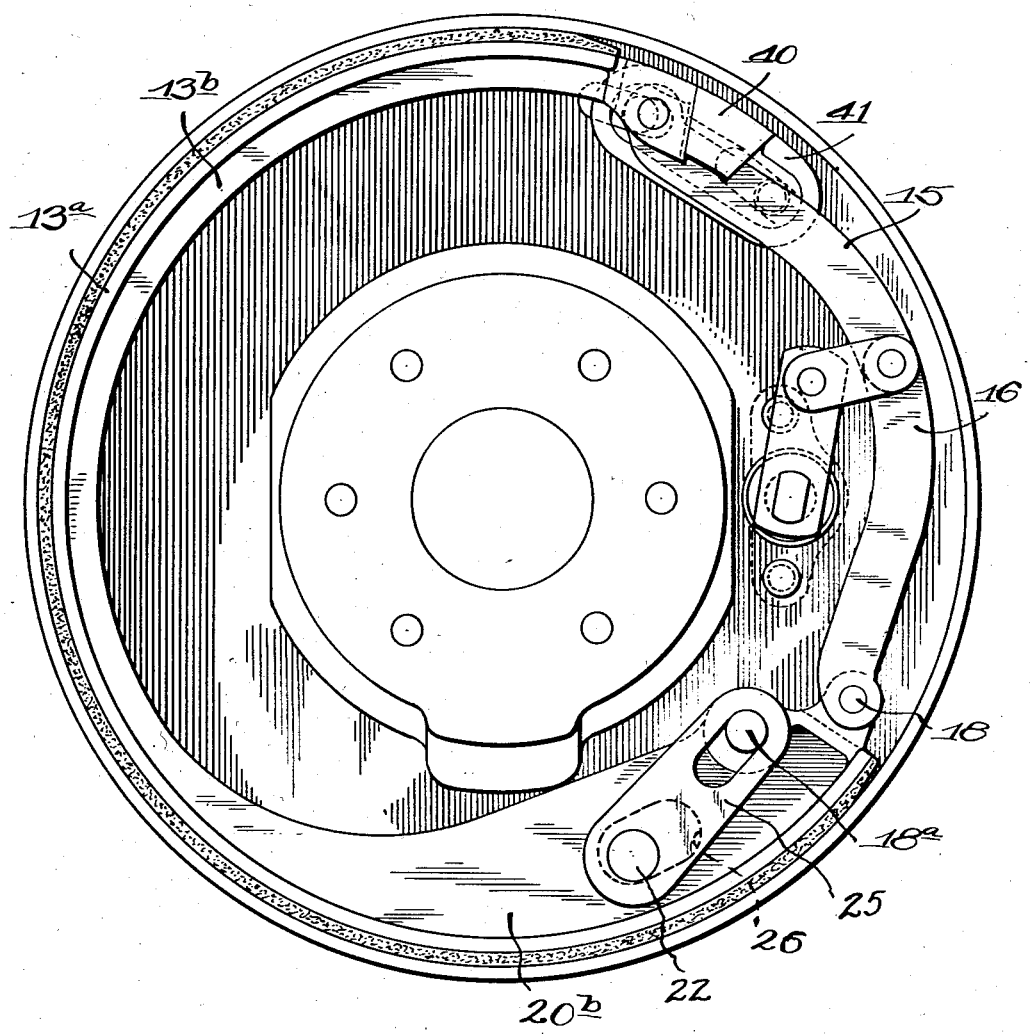
Figure 6 is a view similar to Figure 1 but showing a modified form of brake band provided with an integral upstanding web on its inner face.

In the form shown in Figure 6, it will also be observed that a pin 18a is provided separate from the pin 18 forming the pivotal connection with the toggle link 16, this separate pin 18a forming the pivotal connection between the tension anchored link 25 and the brake band.

The operation of the modified form of brake band is the same in all essential respects as the form shown in Figure 1.

I claim:

1. In a brake, a drum, an internal expanding brake member, applying means for said brake member, a fixed support disposed within the span of said brake member, and a swinging link extending from said support to the adjacent end of said brake member, and arranged substantially perpendicular to the drum radius extending through one end of the link, whereby the braking torque is transmitted to the anchor through said link without any substantial component of force tending to swing said link angularly.

2. In a brake, a drum, an internal expanding brake band, applying means therefor, a relatively rigid anchor piece connected to the inner side of said brake band and having an aperture therethrough, an anchor pin extending through said anchor piece, and a link pivotally connected between said anchor pin and a point on said anchor piece in the direction of rotation of said drum.

3. In a brake, a drum, an internal expanding brake member, applying means therefor comprising toggle links connected between opposite ends of said member, and an anchor for one end of said band having guide means therein for one of said toggle links.

4. In a brake, a drum, an internal expanding brake member, applying means therefor comprising toggle links connected between opposite ends of said member, and an anchor for one end of said band having a slot extending circumferentially of said drum and forming guide means for one of said toggle links.

5. In a brake, a drum, an internal expanding brake member, applying means therefor comprising toggle links connected between opposite ends of said member, and an anchor for one end of said band having a slot on the inner side thereof and extending circumferentially of said drum and forming guide means for one of said toggle links.

6. In a brake, a drum, an internal brake member, applying means for said brake member, a fixed support disposed within the span of said brake member, and a swinging link extending from said support to the adjacent end of said brake member, and arranged in a plane parallel to a line tangent to the adjacent end of said brake member so as to carry the braking torque of the latter under tension.

7. A brake comprising an immovable support and a friction element connected to said support by a link, said link being pivoted at one of its ends to a post fixedly secured to said support and passing through an opening in the friction element and disconnectedly engaging at its other end, a thrust member protruding from said friction element.

8. A brake comprising an immovable support and a friction element connected to said support by a two part link, said link being pivoted at one of its ends to a post fixedly secured to said support and engaging at its other end, a thrust member protruding from said friction element one part of each link positioned on each side of said element.

9. A brake comprising, in combination, a friction device adapted to anchor adjacent either of its ends, the anchorage at least at one end being through the intermediary of a fixed anchor post adjacent said end, together with a link mounted on said post, said link disconnectedly engaging a part of said friction device and extending from said part along the body of and away from the adjacent end of said device and taking the thrust of said device in tension nearer its end than the corresponding anchor post to anchor the latter on said post.

10. A brake friction device having spaced apart ends, having anchorage means including an anchor post beside at least one of said ends and a tension link pivoted to said anchor and extending along the side of said device away from the adjacent end thereof toward the anchor and disconnectedly engaging an element projecting from said friction device nearer its end than the post which it engages.

11. A brake having a friction device adapted to anchor on one or the other of its spaced apart ends, the means for anchoring said device at each of its ends comprising at least at one of said ends a two part tension link pivotally connected at one of its ends with a fixed anchor post and at its other end engaging a pin projecting from each side of said friction device at each end thereof.

12. A brake including friction means constructed at both of its ends to take the braking torque, said construction comprising a link paralleling a part of said means and secured at one of its ends to a fixed member positioned intermediate the ends of the friction element said link contacting, at its other end, a member fixed to the end of said element.

13. A brake comprising a drum, in combination with a friction device having two parts which anchor, one of which is effective when the drum is turning in one direction and the other of which is effective when the drum is turning in the opposite direction, the anchorage in at least one direction of drum rotation including a link connected to the friction device and to an anchor projecting through the friction device.

14. A brake comprising a drum, in combination with a friction device having two parts which anchor, one of which is effective when the drum is turning in one direction and the other of which is effective when the drum is turning in the opposite direction, the anchorage in at least one direction of drum rotation including a pair of tension links embracing the friction device between them.

EARL G. GUNN.